UNITED STATES PATENT OFFICE

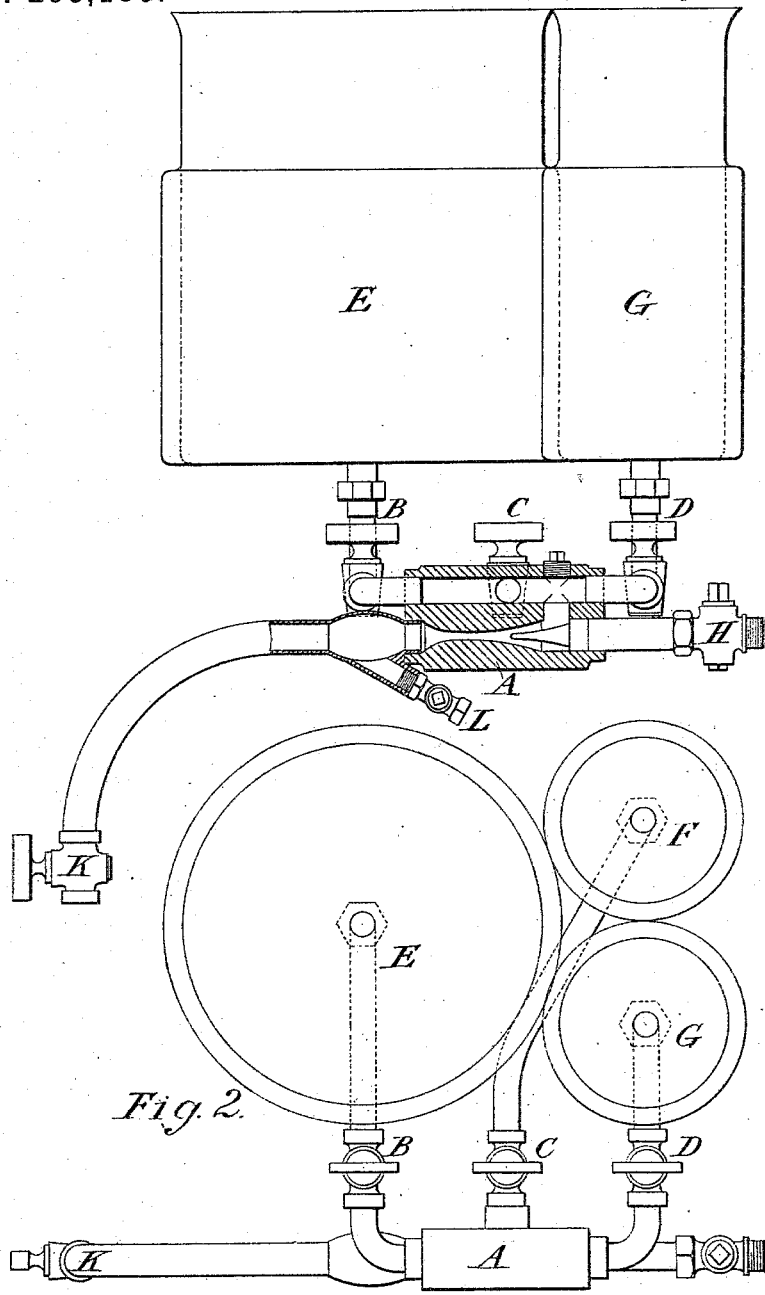

GEORGE LAWRENCE, OF LONDON, ENGLAND.

PROCESS OF TREATING MILK.

SPECIFICATION forming part of Letters Patent No. 295,180, dated March 18, 1884.

Application filed October 15, 1883. (No model.) Patented in England June 8, 1883, No. 2,869.

*To all whom it may concern:*

Be it known that I, GEORGE LAWRENCE, of London, England, have invented a new and useful Process of Treating Milk, (for which I have obtained patent in Great Britain on June 8, 1883, No. 2,869,) of which the following is a specification.

The invention consists in the treatment of milk by the improved mode of breaking it up with fatty matters by passing it and them, mingled with steam or other gases at an elevated temperature, through one or more steam-ejectors, thereby dividing the milk into particles and rendering it more capable of receiving the fatty or other ingredients, which are also disintegrated by their passage, and thus, by the admixture of the milk and fatty or other matters, enriching or otherwise treating such milk.

I am aware that the mixing of fats with milk is old, and also that such mixing has been done by centrifugal force and by machinery; but my invention consists in treating milk by passing it, mingled with fat and heated gases, through steam-ejectors, and thus separating and breaking up all fatty particles, and thereby getting a more perfect blend or enrichment.

I have found the apparatus delineated in the drawings annexed very convenient for carrying out my improved process.

In said drawings, Figure 1 is a side or front elevation, and Fig. 2 a plan view.

Like letters refer to like or corresponding parts.

A is a steam-ejector, (similar in principle to a steam-injector.) One or more of such may be used, around the nozzle or nozzles of which the milk and fatty or other matters are passed, in a fluid state, from the chambers E F G, which, in this case, respectively hold milk, fat, and oil. These chambers are steam-jacketed, for obtaining the necessary temperatures. The milk, fatty, and other ingredients are led to the ejector A from the chambers by their respective outlet-pipes B C D, such outlet-pipes being controlled by stop-cocks, as shown; or the milk and fatty or other ingredients may be mixed or agitated in one chamber, and from that chamber allowed to pass to the ejector direct.

H is a steam-inlet; L, supplementary steam or cold-water inlet for regulating the temperature. K is an outlet for amalgamated material. The milk and fatty or other matters being forced through the ejector by its action are thoroughly amalgamated, and thus milk or cream can be enriched or antiseptically treated.

I claim—

The process of treating milk with fatty and other matters by passing it and them, mingled with gases, through one or more steam-ejectors, for separating and mixing the particles, substantially as described, and for the purposes set forth.

In testimony whereof I have signed this specification in the presence of two subscribing witnesses.

GEORGE LAWRENCE.

Witnesses:
   H. J. HADDAN,
   A. E. MELHUISH.